Patented Oct. 19, 1948

2,451,536

UNITED STATES PATENT OFFICE 2,451,536

DIALLYL DIGLYCOLATE-STYRENE COPOLYMER

Martin E. Cupery, Brandywine Hundred, and Henry S. Rothrock, Wilmington, Del., assignors to E. I. du Pont de Nemours & Company, Wilmington, Del., a corporation of Delaware No Drawing. Application January 25, 1945, Serial No. 574,615

1 Claim. (Cl. 260—78.3)

This invention relates to a new class of unsaturated esters and more particularly to esters derived from unsaturated alcohols and diglycolic acid and to polymers thereof.

There are many well-known advantages to the use of polymers of esters derived from unsaturated alcohols and polybasic acids for coating compositions, sheeting and cast articles and impregnation of fibrous materials. The polymers of such esters as diallyl phthalate, dimethallyl succinate and diallyl maleate, for example, are highly crosslinked and, therefore, are insoluble, infusible and give coating compositions which do not soften at high temperatures and which are inert toward solvents. Similarly, molded or cast articles made of these polymers can be heated to high temperatures without becoming soft or losing their shape and can be used in applications requiring resistance to organic solvents. However, although protective coatings based on any of the prior art diallyl esters have the advantages of infusibility and insolubility, their usefulness suffers seriously from the fact that they are generally quite brittle. Metal panels coated with the crosslinked polymer of diallyl phthalate, for example, cannot be bent through sharp angles without cracking the coating and thereby destroying its protective properties.

We have now discovered that esters derived from certain unsaturated alcohols and one specific saturated dicarboxylic acid, namely diglycolic acid, are unique in that polymers of said esters provide coatings which, in addition to being insoluble and infusible, are tough and pliable and are markedly more scratch resistant and, in general, possess physical properties superior to those of polymers of prior art esters derived from unsaturated alcohols and polybasic acids.

Accordingly this invention has as an object novel esters derived from unsaturated alcohols and diglycolic acid. A further object is a new class of polymers, i. e. polymerized esters derived from unsaturated alcohols and diglycolic acid. A still further object is diallyl diglycolate. Still another object is a polymer of diallyl diglycolate. Still further objects of this invention include coating compositions comprising said polymerized esters; transparent sheetings and pellicles of said polymerized esters; the provision of a process for obtaining said esters; and a process for producing polymers of said esters. Additional objects will become apparent from an examination of the following description and claims.

These and other objects and advantages are accomplished according to the herein-described invention which comprises bis-(2-alkenyl) esters of diglycolic acid and their polymers, including homopolymers and interpolymers.

One preferred embodiment of this invention comprises diallyl diglycolate.

Another preferred embodiment comprises polymers of diallyl diglycolate.

According to the process of this invention a 2-alkene-1-ol is reacted with diglycolic acid to provide a bis-(2-alkenyl) ester of diglycolic acid. A solution of said ester in tertiary butyl alcohol containing a polymerization catalyst is then heated to provide a polymer.

According to one preferred modification of this invention a mixture of allyl alcohol and diglycolic acid is reacted in the presence of a mineral acid. The resultant diallyl diglycolate is dissolved in tertiary butyl alcohol and the resultant solution is heated in the presence of benzoyl peroxide. The reaction mixture is then cooled to allow the polymeric material to precipitate, said precipitate then being separated from the supernatent solution of unchanged monomer in tertiary butyl alcohol.

By the term "polymer," as employed herein and in the appended claims, is meant a macromolecular organic compound containing a plurality of recurring units which are joined together in a chain-like manner. A "homopolymer" is a "polymer" in which said recurring units are the same; while an "interpolymer" is a "polymer" in which said recurring units are different.

The following examples, in which proportions are in parts by weight unless otherwise specified, are given for illustrative purposes and are not intended to place any restrictions on the herein-described invention.

EXAMPLE I

*Preparation of diallyl diglycolate*

The following materials were charged into a reaction vessel with a stirrer, a nitrogen inlet and a reflux condenser attached to a water separator so arranged that the water which separates out as a lower layer in the distillate can be drawn off while the upper organic layer is continuously returned to the reaction vessel: 144 parts purified diglycolic acid, 174 parts allyl alcohol, 2.7 parts concentrated sulfuric acid and 180 parts of benzene. The air in the vessel is displaced with nitrogen and the mixture heated to reflux. The water of esterification is removed as it is formed and refluxing is continued until an aqueous layer is no longer formed in the distillate. Sixty parts of aqueous layer is collected. After cooling, the reaction mixture is washed with water, dilute sodium carbonate solution to remove the sulfuric acid, again with water, and then dried over anhydrous magnesium sulfate and distilled. The fraction boiling at 109–111° C. at 1 mm. mercury pressure is collected as pure diallyl diglycolate. It weighs 174 parts and is a colorless, mobile liquid having an index refraction of 1.4548 at 24° C. It is insoluble in water, petroleum ether and cyclohexane but miscible with alcohols, ketones, esters; aromatic hydrocarbons and ether.

EXAMPLE II

*Coating compositions from diallyl diglycolate*

Diallyl diglycolate containing 1% benzoyl peroxide is heated at 60° C. for 16 hours. The viscous material so obtained is diluted with half its volume of xylene and applied in a thin coat to a panel of black iron which is then heated at 165° C. for 20 minutes. The films so obtained are very hard, tough, scratch resistant, have good adhesion to the substratum and are not affected by prolonged soaking in water. Coatings prepared in this way are remarkably superior to those prepared in a similar fashion from the other diallyl esters known to the art. Metal coated with diallyl diglycolate polymer can be bent and formed without injury to the finish, whereas metal coated with the polymers of diallyl esters such as the phthalate or maleate cannot be bent without injury to the protective coating.

EXAMPLE III

*Partial polymerization of diallyl diglycolate at elevated temperatures*

Diallyl diglycolate is placed in a vessel with a reflux condenser and an air inlet tube below the level of the liquid. A slow stream of air is passed through the liquid as it is heated at 170–180° C. The viscosity begins to increase after about 40 minutes. In order to prevent gelation, which would lead to an insoluble product, it is necessary to check the polymerization by the addition of 0.01% hydroquinone (based on the total charge) and to cool the mixture shortly after the viscosity increase is noticed. The viscosity of the resulting syrup is dependent upon when the polymerization is checked. If the hydroquinone is added after 40 minutes heating the syrup has a viscosity of 2.5 poises and addition of the hydroquinone after 44 minutes gives a syrup having a viscosity of 8.8 poises. These syrups may be diluted with hydrocarbon, ketone or ester type solvents or used directly for the impregnation of fibrous or porous materials, bonding plywood, preparation of solid transparent articles or for coating compositions. After application, they can, by further heating, be converted to a hard, insoluble, infusible state.

EXAMPLE IV

*Preparation of colorless scratch-resistant sheeting from diallyl diglycolate*

Diallyl diglycolate containing 2% benzoyl peroxide is placed between two pieces of glass plate spaced about 1/8" apart and heated for 144 hours at 65° C. Upon cooling, the glass plates are readily removed from the colorless, rigid sheet of diallyl diglycolate polymer. Cast articles prepared in this way in addition to having unusual clarity and freedom from color are extremely hard (Rockwell hardness of H–94) and, in comparison with other common plastics such as polymethyl methacrylate, polydiallyl phthalate or Columbia resins, are very resistant to scratching. For example, the sheeting may be rubbed with steel wool without damage to its surface whereas the common plastics are readily worn away upon similar treatment. The solid resin may be sawed, machined or milled and may readily be polished to optical clarity.

EXAMPLE V

*Preparation of soluble polymers of diallyl diglycolate by polymerization in tert.-butyl alcohol*

One hundred parts of monomeric diallyl diglycolate and two parts of benzoyl peroxide are dissolved in 100 parts of tert.-butyl alcohol. The mixture is heated for 5½ hours at 80° C. and then cooled and centrifuged. The mixture consists of two layers, an upper layer which is fluid, and consists of tert.-butyl alcohol and unchanged monomeric ester, and a lower semi-solid layer of polymeric diallyl diglycolate. The upper layer is decanted from the polymer and is heated again for 5 hours at 80° C. Upon cooling and centrifuging another crop of polymer is obtained. This process may be repeated until practically all of the monomeric ester has been converted to a resinous polymer. The polymer prepared in this way is soluble in hydrocarbons, esters and ketones and can be converted to an insoluble infusible state by further heating.

While this invention has been illustrated with particular reference to monomeric diallyl diglycolate and polymers thereof, it is to be understood that bis-(2-alkenyl) esters of diglycolic acid broadly and their polymers are included within the scope thereof. The bis-(2-alkenyl) esters of diglycolic acid of this invention, which are had from 2-alkene-1-ols which are stable toward mineral acids, are readily prepared by heating a mixture of the 2-alkene-1-ol and diglycolic acid in the presence of a mineral acid to catalyze the reaction. In the case of 2-alkene-1-ols which are not stable in acid media, e. g. methallyl and crotyl alcohols, diglycolates thereof are prepared from a diglycolate of a more volatile alcohol by ester interchange.

For example dimethallyl diglycolate can be prepared by treating dimethyl diglycolate with at least twice its molar amount of methallyl alcohol in the presence of an alkaline catalyst e. g. sodium methallyloxide. The mixture is heated under an efficient fractionating column and the methanol liberated in the ester interchange is removed by distillation as it is formed. When the theoretical amount of methanol has been collected, the dimethallyl diglycolate is isolated from the reaction mixture which consists of a solution of the desired ester in methallyl alcohol.

As hereinbefore stated, any 2-alkene-1-ol may be reacted with diglycolic acid in accordance with the process of this invention. Included among examples of said alcohols are: allyl alcohol, crotyl alcohol, methallyl alcohol, tiglyl alcohol, 2-chlorobutene-2-ol-1, 3-hydroxybutene-1, cinnamyl alcohol, 1-hydroxy-2-methyl-hexene-2 and the like.

The novel esters of this invention are bis-(2-alkenyl) esters of diglycolic acid. Included among examples of said esters are: diallyl diglycolate obtained by retracting diglycolic acid with allyl alcohol; dicrotyl diglycolate obtained by reacting crotyl alcohol with an ester of diglycolic acid and a lower boiling alcohol; dimethallyl diglycolate obtained by reacting methallyl alcohol with an ester of diglycolic acid and a lower boiling alcohol; ditiglyl diglycolate obtained by reacting tiglyl alcohol with an ester of diglycolic acid and a lower boiling alcohol; bis-(beta-chlorocrotyl) diglycolate obtained by reacting 2-chlorobutene-2-ol-1 with an ester of diglycolic acid and a lower boiling alcohol; dibuten-1-yl-3 diglycolate obtained by reacting 3-hydroxybutene-1 with an ester of diglycolic acid and a lower boiling alcohol; dicinnamyl diglycolate obtained by reacting cinnamyl alcohol with an ester of diglycolic acid and a lower boiling alcohol; and bis-(2-methyl-hexene-2-yl-1) diglycolate obtained by reacting 1-hydroxy-2-methyl-hexene-2 with an ester of diglycolic acid and a lower boiling alcohol.

The methods of polymerization described above are merely illustrative. The monomeric bis-(2-alkenyl) esters of diglycolic acid of this invention may be polymerized in any desired manner. Oxygen-yielding catalysts, for example benzoyl peroxide, are particularly suitable for use in promoting the reaction although it is possible to operate even in the absence of a catalyst. Polymerizations are generally sluggish at low temperatures and require heating in the neighborhood at 50–200° C. to produce resinification at a reasonable rate. Polymerization is generally accelerated by the addition of catalysts such as peroxy catalysts, e. g., benzoyl peroxide, ozone, hydrogen peroxide, perphthalic acid, peracetic acid, dibutyryl peroxide, lauroyl peroxide, succinyl peroxide, tert.-butyl hydroperoxide and the like. The catalyst concentration may be varied within the range of 0.1 to 10% but the range of 1–5% is preferred. The time required for the polymerization is largely dependent upon the conditions used and the concentration of the catalyst, and may vary from a few hours to several days. Low concentrations of catalyst and lower temperatures favor low rates of polymerization. The polymerizations may be carried out in bulk without added diluent or may be conducted in solution in organic-type solvents or in emulsions in aqueous systems. Subatmospheric and superatmospheric pressures may sometimes be employed to advantage.

Under mild polymerizing conditions, e. g. at relatively low temperatures and in the presence of not more than minor amounts of catalyst, the thin, mobile, monomeric esters of this invention can be polymerized to yield viscous syrups which consist of soluble polymer dissolved in unchanged monomeric ester. These syrups applied as coatings can be baked at elevated temperatures to yield finishes which are insoluble and infusible yet remarkably tough and pliable. Since much of the unchanged monomer in the syrup is lost by evaporation on baking the coating, more economical coating compositions can be prepared by isolation of the soluble polymer from the unchanged monomer. The polymer may then be dissolved in inexpensive hydrocarbon solvents and used for coating compositions. This separation may be accomplished by pouring the syrup into a large volume of a solvent such as methanol in which the monomeric ester is miscible but from which the polymeric material precipitates, or by evaporation of the unchanged monomer at reduced pressures. By these and other conventional methods of separation the soluble polymer can be freed of unchanged monomer which can then be purified and again subjected to polymerization to produce further quantities of the soluble polymer. Although the coating compositions prepared from polymer freed of unchanged monomer are more economical in that the unused monomer is recovered for reuse, the conventional methods of separation in themselves are laborious and expensive. By means of this invention soluble polymer may be prepared directly without involving a laborious isolation process. To accomplish this diallyl diglycolate is polymerized in hot tertiary-butyl alcohol solution, in the presence of suitable polymerization catalysts. Polymerization is allowed to proceed until the hot mixture shows faint turbidity. At this point the mixture is cooled whereupon polymeric diallyl diglycolate precipitates as a sticky, viscous resin. The upper layer, consisting of tertiary-butyl alcohol and unchanged monomeric diallyl diglycolate, is decanted and heated for an additional period to promote further polymerization. The lower resinous layer may be dissolved in a suitable solvent and applied as a coating composition which upon baking at elevated temperatures is converted to a hard, insoluble finish.

As described above, monomeric unsaturated diglycolates may be polymerized under mild conditions to a viscous syrup consisting of polymeric ester dissolved in the monomeric ester. Upon continued heating under these conditions the mixture becomes more and more viscous until it is a soft gel. On further heating hard, transparent masses are obtained. Thus, sheeting prepared by heating diallyl diglycolate containing 2% of benzoyl peroxide is remarkably superior to sheeting prepared in a similar manner from prior art diallyl esters. Diallyl diglycolate sheeting is unusually hard, colorless and resists abrasion with fine steel wool, whereas diallyl phthalate sheeting is relatively soft and easily scratched with steel wool.

While substantial effects are had from all monomeric bis-(2-alkenyl) esters of diglycolic acid and polymers thereof, polymerized diallyl diglycolate provides pellicles, sheets and cast objects possessing maximum hardness and scratch resistance.

This invention provides a new class of unsaturated esters the polymers of which are valuable as coating compositions and for the preparation of cast articles which have many advantages over previously known polyunsaturated ester polymers. These esters, particularly in the partially polymerized or bodied form described in the examples, are useful in various types of coating compositions. Both with and without added cobalt or other driers these esters can be set up to yield hard, light-colored films which are exceptionally tough and pliable in comparison to films from previously known unsaturated esters. The use of the bodied esters in coating compositions is to be preferred over the use of the unbodied materials since the viscosity and surface tension characteristics of the bodied esters are much more suitable for use in the production of films. While it is possible to obtain good films from these bodied esters in an unmodified condition, it is sometimes desirable to add other agents as modifying agents. Satisfactory enamels may be prepared by incorporating pigments with the esters, particularly in the bodied form. In preference to using the pure bodied ester by itself, it is sometimes desirable to body mixtures of two or more of these esters or one of these esters and another similar material.

While this invention has been illustrated with particular reference to homopolymers of bis-(2-alkenyl) esters of diglycolic acid, it is to be understood that polymers broadly, including homopolymers and interpolymers of said esters, are included within the scope hereof. The novel interpolymers obtained according to this invention are obtained by interpolymerizing a bis-(2-alkenyl) ester of diglycolic acid with a polymerizable compound which contains at least one ethylenically unsaturated linkage. It is contemplated that any bis-(2-alkenyl) ester of diglycolic acid and that any polymerizable compound which contains at least one ethylenically unsaturated linkage may be employed in the preparation of said interpolymers. By the expression "polymerizable compound which contains at least one ethylenically unsaturated linkage," as used herein and in the appended claims, is meant an organic compound which contains at least one C=C double bond which is not present in a benzene nucleus, i. e. at least one ethylenic double bond, said compound having the property of polymerizing to yield a macromolecular organic compound containing a plurality of recurring units which are joined together in a chain-like manner, i. e. products having a degree of polymerization greater than a trimer. Preferably, on account of the greater ease of polymerization, said polymerizable compound containing at least one ethylenically unsaturated linkage is a polymerizable compound containing a terminal ethylenic double bond. Included among representative polymerizable compounds containing at least one ethylenically unsaturated linkage are: alpha-methylene monocarboxylic acids, such as acrylic and methacrylic acids, their monohydric alcohol esters, such as methyl acrylate, ethyl acrylate, methyl methacrylate, butyl methacrylate, acryl and methacrylamides, acrylonitrile and methacrylonitrile, vinyl carboxylates such as vinyl acetate, vinyl isobutyrate, vinyl laurate and vinyl benzoate, vinyl halides, such as the chloride, bromide and fluoride, styrene, methyl vinyl ketone, methyl isopropenyl ketone, butadiene, isoprene, and other diene hydrocarbons, N-vinylimides such as N-vinylphthalimide and N-vinylsuccinimide, polyhalogenated ethylenes, such as unsymmetrical dichloroethylene, difluoroethylene, trifluoroethylene, trifluorochloroethylene and tetrafluoroethylene, and esters of itaconic acid. Representative polyfunctional compounds which may be employed as interpolymer ingredients include the polyhydric alcohol esters of methacrylic and acrylic acids, such as ethylene glycol dimethacrylate, hexamethylene glycol dimethacryate, dimethallyl carbonate, ethylidene dimethacrylate, and hexamethylene dimethacrylamide.

For example, when a mixture of 80 parts of diallyl diglycolate, 20 parts of styrene and one part of benzoyl peroxide is heated at 80° C. for 48 hours a syrup of a viscosity of 2.0 poise is obtained which when coated on steel and baked for 45 minutes at 150° C. gives clear, hard, tough, insoluble coatings. Similarly, when methyl methacrylate is substituted for the styrene a 2.25 poise syrup is obtained after 30 minutes at 80° C. Very hard, tough, inert coatings result upon baking films of the methacrylate modified diglycolate. In a like manner interpolymers with one or more other monofunctional polymerizable monomers such as acrylonitrile, ethyl acrylate, vinyl acetate, or vinyl chloride can be prepared as well as interpolymers with one or more polyunsaturated monomers as for example allyl acrylate, vinyl crotonate, diallyl adipate, di-ethallyl maleate, butadiene, tetraallyl silicate, dicrotyl carbonate, N,N'-diallyl urea, N,N'-dimethallyl adipamide, N-allyl methacryl-amide, etc.

When polymerizing a bis-(2-alkenyl) ester of diglycolic acid with another polymerizable compound or admixture of other polymerizable compounds, the ratio of said ester to other polymerizable material may be varied within relatively wide limits. However, the mixture of polymerizable compounds subjected to polymerization should contain at least 2% by weight of one of said bis-(2-alkenyl) esters or of a mixture of said esters. Polymeric products superior for most purposes are had when said mixture has at least 25% by weight of one of said esters or of any admixture of said esters; while polymeric products having optimum properties result when said mixture contains more than 50% by weight of one of said esters or of an admixture of said esters.

As hereinbefore stated, the ratio by weight of bis-(2-alkenyl) ester of diglycolic acid to other polymerizable material in the interpolymers of this invention is at least 2:98. For most purposes, however, said ratio should be at least 25:75, while interpolymers having optimum properties are those in which said ratio is greater than 50:50.

As many apparently widely different embodiments of this invention may be made without departing from the spirit and scope thereof, it is to be understood that we do not limit ourselves to the specific embodiments thereof except as defined in the appended claim.

Having described the present invention, the following is claimed as new and useful:

An interpolymer of diallyl diglycolate and styrene wherein the ratio by weight of said ester to styrene is at least 2 to 98.

MARTIN E. CUPERY.
HENRY S. ROTHROCK.

REFERENCES CITED

The following references are of record in the file of this patent:

UNITED STATES PATENTS

| Number | Name | Date |
|---|---|---|
| 2,386,999 | Adelson et al. | Oct. 16, 1945 |